United States Patent
Takahashi et al.

(10) Patent No.: US 6,912,234 B2
(45) Date of Patent: Jun. 28, 2005

(54) OPTICAL PICKUP APPARATUS AND LASER DIODE CHIP

(75) Inventors: Shinichi Takahashi, Tokorozawa (JP); Hirokatsu Nagatake, Tokorozawa (JP); Aki Yoshioka, Tokorozawa (JP); Mitsutoshi Sugano, Tokorozawa (JP); Ko Ishii, Tokorozawa (JP); Makoto Kawamura, Tokorozawa (JP); Akira Miura, Tokorozawa (JP); Masayuki Koyama, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/770,673

(22) Filed: Jan. 29, 2001

(65) Prior Publication Data

US 2001/0050933 A1 Dec. 13, 2001

(30) Foreign Application Priority Data

Feb. 9, 2000 (JP) ........................................ 2000-031786

(51) Int. Cl.⁷ ............................................... H01S 3/10
(52) U.S. Cl. ....................... 372/23; 372/50; 369/44.37
(58) Field of Search ............................. 372/23, 50, 43, 372/45; 369/44.37

(56) References Cited

U.S. PATENT DOCUMENTS

| | | | |
|---|---|---|---|
| 5,619,521 A | * | 4/1997 | Tanaka ......................... 372/50 |
| 6,043,935 A | | 3/2000 | Lee ............................. 359/566 |
| 6,067,283 A | | 5/2000 | Muramatsu .................. 369/112 |
| 6,072,579 A | | 6/2000 | Funato ........................ 356/347 |
| 6,084,843 A | | 7/2000 | Abe et al. .................... 369/112 |
| 6,125,091 A | * | 9/2000 | Kasuga .................. 369/112.05 |
| 6,304,542 | | 10/2001 | Dang et al. ............. 369/112.23 |
| 6,337,841 | | 1/2002 | Kim et al. .............. 369/112.06 |
| 6,347,103 | | 2/2002 | Song et al. .................... 372/36 |
| 6,353,587 | | 3/2002 | Hong et al. ............. 369/112.15 |
| 6,373,807 | | 4/2002 | Ohtaki et al. ........... 369/112.01 |
| 6,377,536 | | 4/2002 | Kim et al. .............. 369/112.17 |
| 6,449,235 | | 9/2002 | Kim et al. .............. 369/112.01 |
| 6,449,237 | | 9/2002 | Yoo et al. ............... 369/112.05 |

FOREIGN PATENT DOCUMENTS

JP 11-97804 4/1999

* cited by examiner

*Primary Examiner*—Minsun Oh Harvey
*Assistant Examiner*—James Menefee
(74) *Attorney, Agent, or Firm*—Morgan, Lewis & Bockius LLP

(57) ABSTRACT

An optical pickup apparatus and a laser diode chip which can simplify and miniaturize a construction of the apparatus is provided for using a plurality of laser beams of different wavelengths. The laser diode chip is a chip for the optical pickup apparatus in which a plurality of light emitting portions for emitting the laser beams of the different wavelengths in the same emitting direction are formed on a substrate. Light emitting points of the plurality of light emitting portions are located at positions which are different in the emitting direction.

5 Claims, 6 Drawing Sheets

OPTICAL PICKUP APPARATUS AND LASER DIODE CHIP

BACKGROUND OF THE INVENTION

1. Field of the Invention

The invention relates to an optical pickup apparatus for reading information from a plurality of different kinds of recording media by emitting a plurality of laser beams having different wavelengths and relates to a laser diode chip for the optical pickup apparatus.

2. Description of the Related Art

Generally, a semiconductor laser device is used as a light source of an optical pickup apparatus for playing an optical information recording medium such as CD, DVD, or the like.

To play back the recording medium, the light emission wavelength and the numerical aperture (NA) of an objective lens of the semiconductor laser device which is used for playing a CD and for playing a DVD are different from each other. For example, in the case of the DVD, the wavelength is equal to 650 nm and the NA is equal to 0.6 and, in the case of the CD, the wavelength is equal to 780 nm and the NA is equal to 0.45.

To play different kinds of discs such as CD, DVD, and the like by one disc player, therefore, an optical pickup apparatus having therein light sources of two wavelengths of 650 nm and 780 nm is being used. FIG. 1 shows an example of the optical pickup apparatus.

According to the optical pickup apparatus shown in FIG. 1, a laser device 1 for emitting a laser beam having a wavelength of 650 nm, a laser device 2 for emitting a laser beam having a wavelength of 780 nm, a synthesizing prism 3, a half mirror 4, a collimator lens 5, and an objective lens 6 are sequentially arranged. Further, a photodetector 7 is arranged on another optical axis which is branched from the half mirror 4. In the construction, since an optical system starting with the synthesizing filter 3 and extending to an optical disc 8 is used in common for the CD and DVD, in both cases, the light emitted from the laser device passes through the synthesizing filter 3 and, thereafter, is guided toward the optical disc 8 along an optical axis Y. The objective lens 6 used here is a lens having double focal points and different focal positions can be obtained in accordance with two wavelengths. A spherical aberration which is caused by different thicknesses of surface substrates of the CD and DVD can be, consequently, suppressed.

In the construction, however, since a synthesizing prism or the like is needed, a large number of parts is required and the costs of production are high. Further, because it is necessary to match the positions of the two laser devices and the synthesizing prism, the construction becomes complicated, and it is difficult to make adjustments to the device.

OBJECTS AND SUMMARY OF THE INVENTION

In consideration of the problems, it is an object of the present invention to provide an optical pickup apparatus and a laser diode chip, in which a construction of the apparatus for using a plurality of laser beams having different wavelengths can be simplified and miniaturized.

According to a laser diode chip of the invention, there is provided a laser diode chip for an optical pickup apparatus in which a plurality of light emitting portions are formed on a substrate for emitting laser beams having different wavelengths in the same emitting direction, wherein light emitting points of the plurality of light emitting portions are located at different positions in the emitting direction.

According to the invention, there is provided an optical pickup apparatus comprising: a light emitting device in which a plurality of light emitting portions for emitting laser beams having different wavelengths are formed on a substrate and the laser beams are selectively emitted in the same emitting direction from one of the plurality of light emitting portions; and an optical system for guiding the laser beams emitted from the light emitting device to a recording surface of a recording medium and guiding a laser beam reflected by the recording surface of the recording medium to a photosensing device, wherein the light emitting device is constructed in a manner such that light emitting points of the plurality of light emitting portions are located at different positions in the emitting direction.

DETAILED DESCRIPTION OF THE PREFERRED EMBODIMENTS

Embodiments of the invention will now be described in detail hereinbelow with reference to the drawings.

Figure 1:
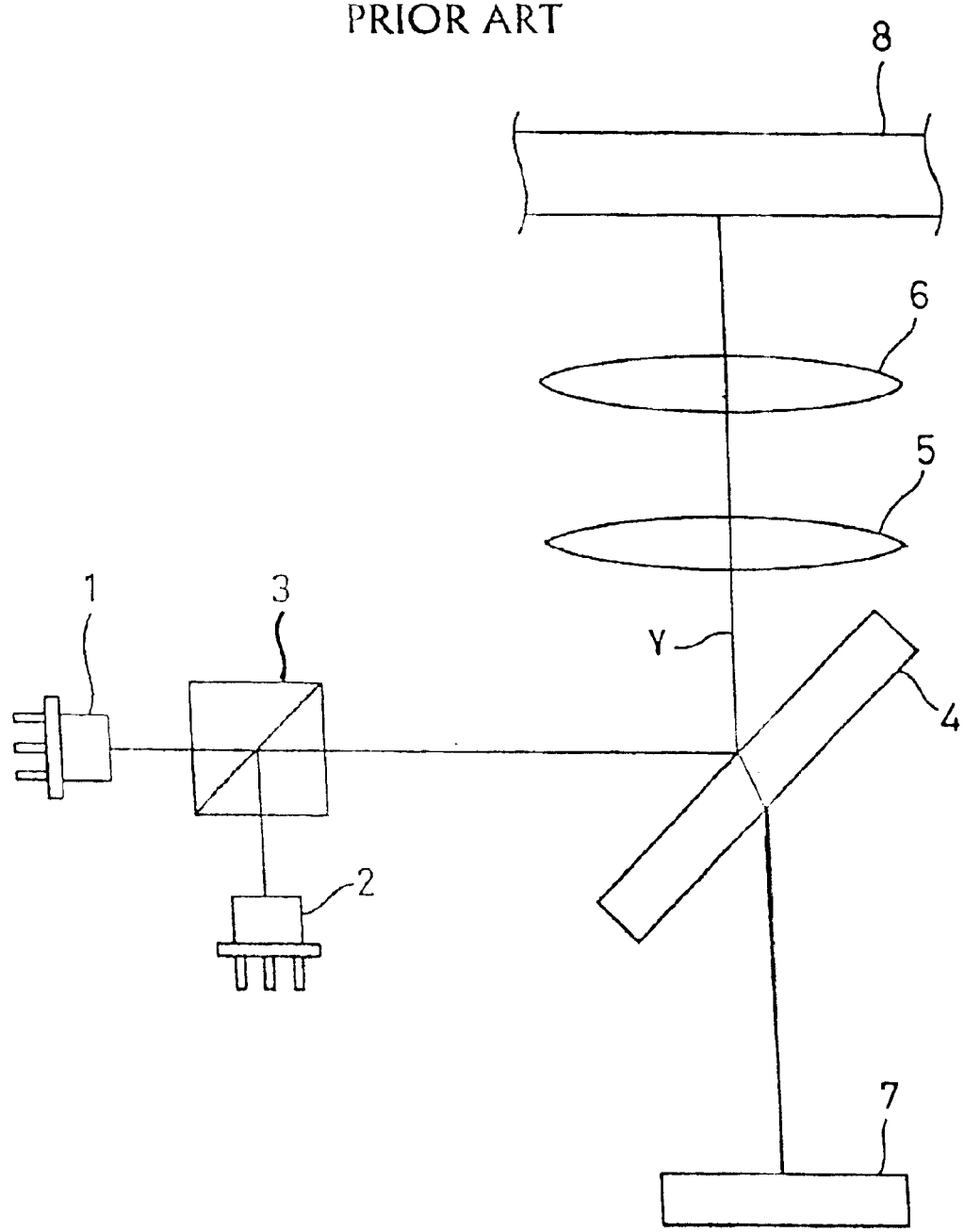
FIG. 1 is a constructional diagram showing an example of a conventional optical pickup apparatus.
Figure 2:
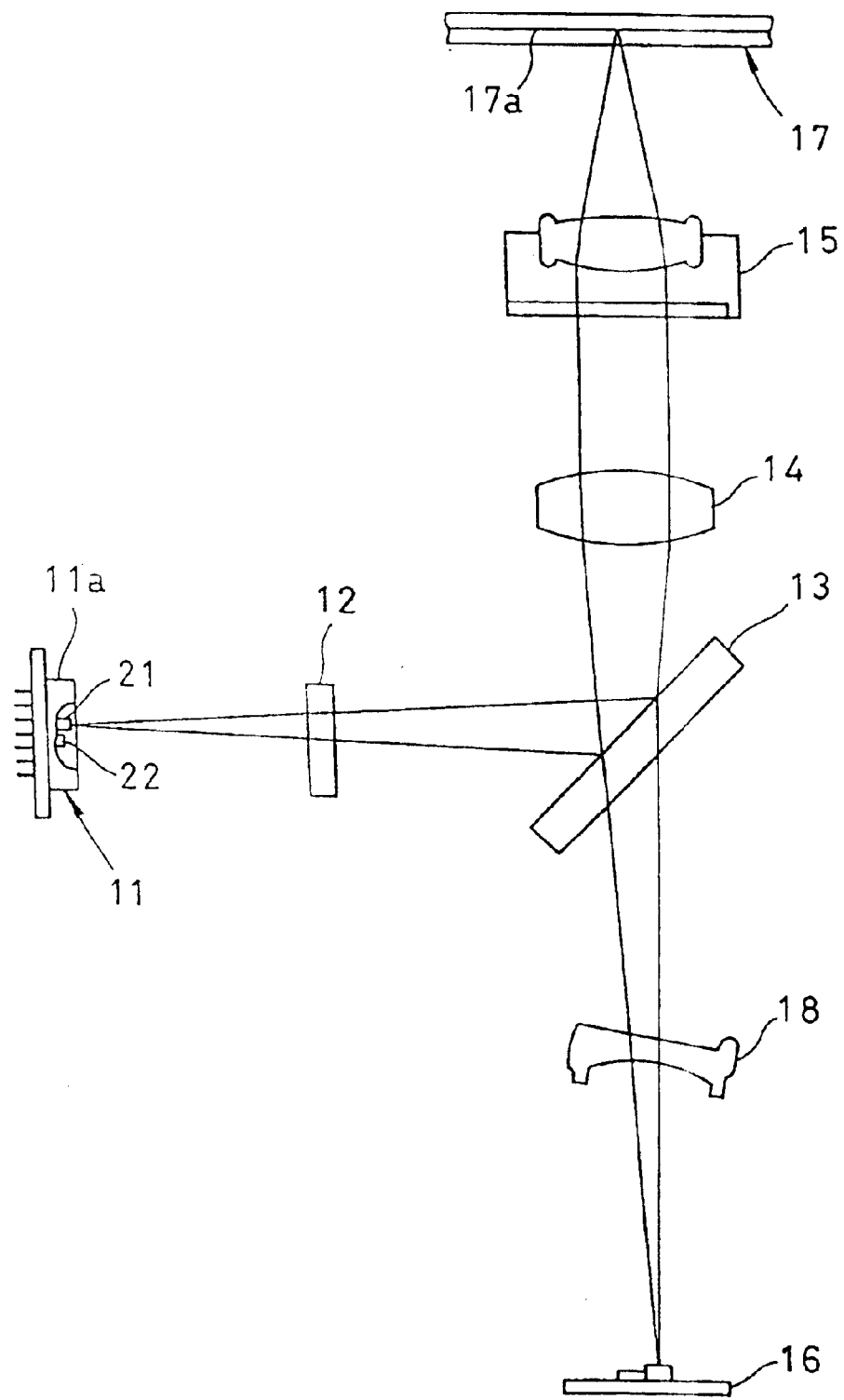
FIG. 2 is a diagram showing a construction of an optical pickup apparatus according to the invention and an optical path of a laser beam in the case where an optical disc is a DVD.
Figure 3:
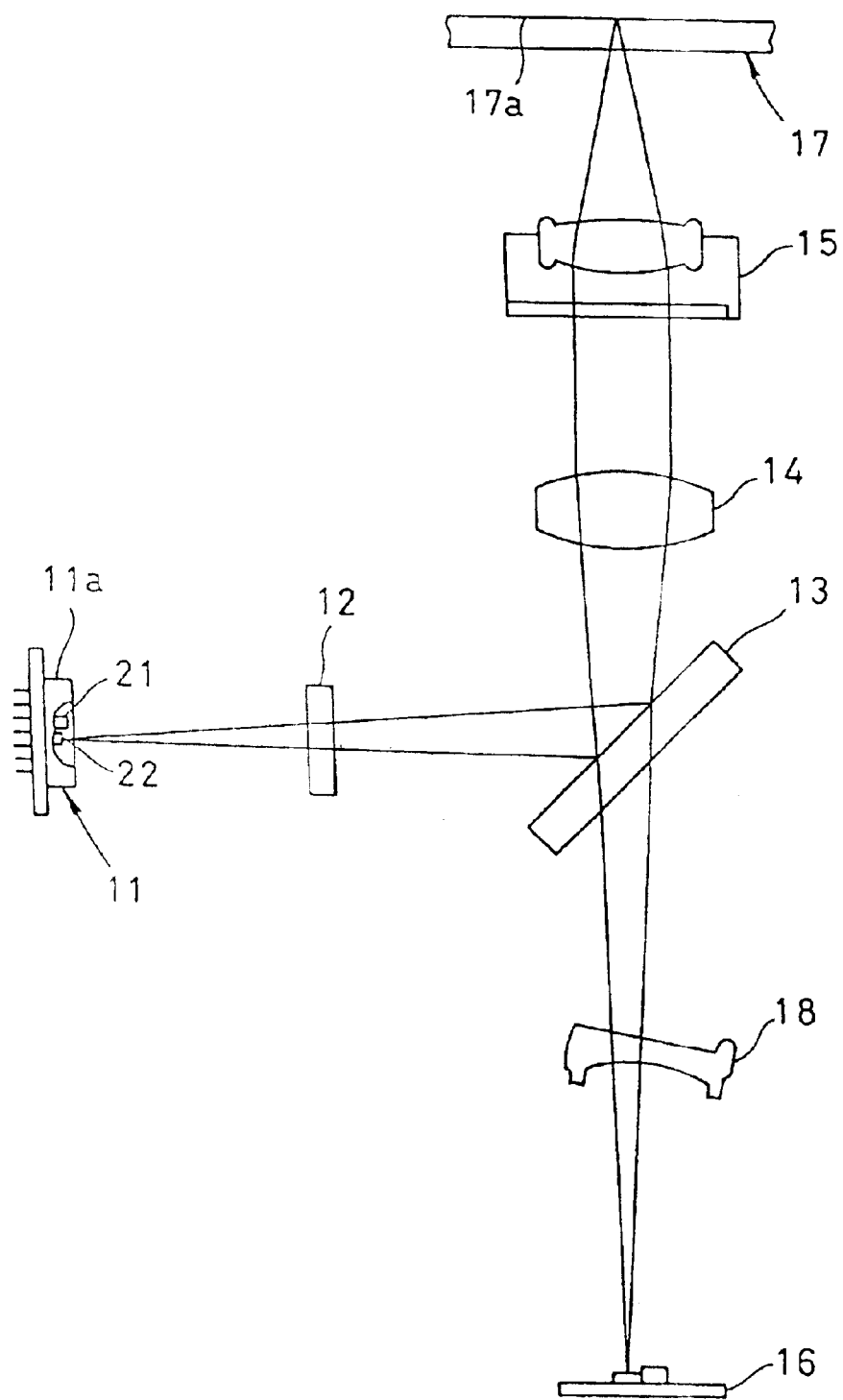
FIG. 3 is a diagram showing an optical path of a laser beam in the case where an optical disc is a CD.

FIGS. 2 and 3 show an optical system of an optical pickup apparatus according to the invention. The optical pickup apparatus has a semiconductor laser device 11 for emitting two laser beams having different wavelengths. In the optical pickup apparatus, the laser beam emitted from the semiconductor laser device 11 reaches a half mirror (beam splitter) 13 through a grating 12. The grating 12 is provided for separating the laser beam into a plurality of light beams (0th order light, ±1 primary lights). The 0th order light is used for focusing servo control. The ±1 primary lights are used for tracking servo control.

The half mirror 13 reflects the incident laser beam at an angle of almost 90° for the incidence of the laser beam. The direction of the reflected laser beam is equal to a direction toward an optical disc 17 as a recording medium. A collimator lens 14 and an objective lens 15 are arranged between the half mirror 13 and optical disc 17.

The collimator lens 14 converts the laser beam from the half mirror 13 into a parallel light and supplies it to the objective lens 15. The objective lens 15 is a lens having double focal points and converges the laser beam of the parallel light onto a recording surface of the disc 17. The recording surface of the disc 17 reflects the laser beam. The laser beam reflected by the recording surface is converted into a parallel laser beam by the objective lens 15 and collimator lens 14 and, thereafter, linearly passes through the half mirror 13. A cylindrical lens 18 and a photodetector 16 are sequentially arranged in the optical axial direction which passes through the half mirror 13. The cylindrical lens 18 is an astigmatism generating device for forming an astigmatism.

FIG. 2 shows the case where a DVD is used as an optical disc 17. A first laser beam having a wavelength of 650 nm is emitted from the semiconductor laser device 11. FIG. 3 shows the case where a CD is used as an optical disc 17. A second laser beam having a wavelength of 780 nm is emitted from the semiconductor laser device 11.

Figure 4:
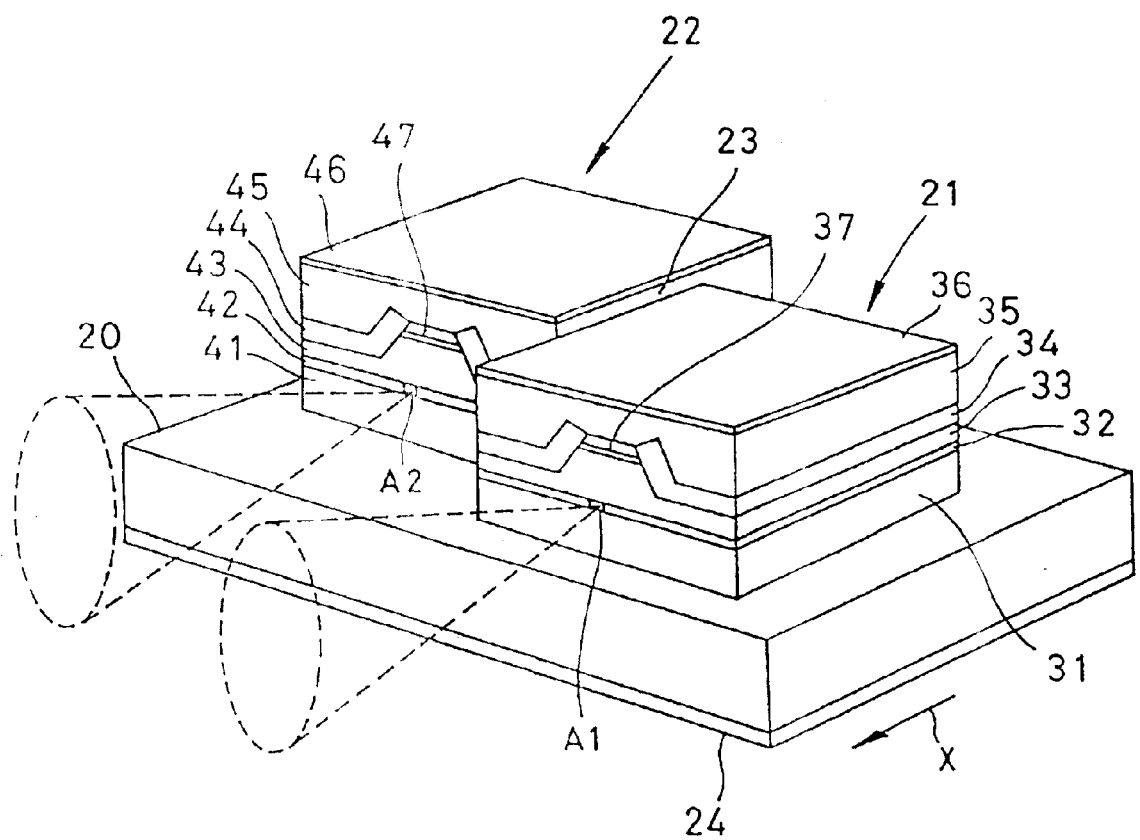
FIG. 4 is an external view showing a chip of a semiconductor laser device of a hybrid type.

FIG. 4 shows an external view of a chip of the semiconductor laser device 11. As shown in FIG. 4, the semiconductor laser device 11 is provided in the form of a single chip. A first light emitting portion 21 having a first light emitting point A1 for emitting the first laser beam of the wavelength of 650 nm and a second light emitting portion 22 having a second light emitting point A2 for emitting the second laser beam of the wavelength of 780 nm are formed on one principal surface of a single n-type GaAs substrate 20 through a separating groove 23. Each of the first light emitting portion 21 and second light emitting portion 22 has a laminate structure as will be explained hereinlater. A back electrode 24 serving as a common electrode of both light emitting portions 21 and 22 is formed on the other principle surface of the substrate 20.

The light emitting surface of the first light emitting portion 21 having the light emitting point A1 and that of the second light emitting portion 22 having the light emitting point A2 are directed in the same emitting direction (shown by an arrow X). The light emitting surface of the first light emitting portion 21 and that of the second light emitting portion 22, however, are not located on the same plane. Assuming that the light emitting surface side is oriented in the forward direction, i.e., as shown in FIG. 4, in the direction of the arrow A, the first light emitting portion 21 and second light emitting portion 22 are arranged on the substrate 20 so that the light emitting surface of the second light emitting portion 22 is located on a plane that is behind the light plane of the emitting surface of the first light emitting portion 21.

The first light emitting portion 21 has an n-type AlGaInP clad layer 31, a strain quantum well active layer 32, a p-type AlGaInP clad layer 33, an n-type GaAs layer 34, a p-type GaAs layer 35, and an electrode 36 in that order onto the GaAs substrate 20. A cross section of the clad layer 33 is formed in a trapezoidal shape in its center portion. The n-type GaAs layer 34 is formed so as to cover the clad layer 33 excluding the trapezoidal top surface. A p-type GaInP layer 37 is formed on the trapezoidal top surface. The first light emitting point A1 is located in the strain quantum well active layer 32.

In a manner similar to the first light emitting portion 21, the second light emitting portion 22 has an n-type AlGaInP clad layer 41, a strain quantum well active layer 42, a p-type AlGaInP clad layer 43, an n-type GaAs layer 44, a p-type GaAs layer 45, and an electrode 46 in that order. A cross section of the clad layer 43 is formed in a trapezoidal shape in its center portion. The n-type GaAs layer 44 is formed so as to cover the clad layer 43 excluding the trapezoidal top surface. A p-type GaInP layer 47 is formed on the trapezoidal top surface. The second light emitting point A2 is located in the strain quantum well active layer 42. An interval between an optical axis from the first light emitting point A1 and an optical axis from the second light emitting point A2 is set to, for example, 100 $\mu$m.

The semiconductor laser device 11 is fixed to an insulating sub-mount and covered by a casing member 11a as shown in FIGS. 2 and 3.

The semiconductor laser device 11 selectively generates either the first laser beam or the second laser beam in accordance with a control signal from a laser driving unit (not shown). Although both of the first and second laser beams are not simultaneously emitted, a center axis of the first laser beam and a center axis of the second laser beam are substantially parallel. Each of the emitted first and second laser beams has an elliptic shape as shown by a broken line in FIG. 4. In the invention, a center axis of the laser beam corresponds to a line passing through the center of the distribution of light intensity on the cross section of the laser beam.

In the above construction, the first or second laser beam emitted from the semiconductor laser device 11 is separated to a plurality of light beams (0th order light, ±1 primary lights) by the grating 12 as mentioned above and, thereafter, reflected by the half mirror 13. The laser beam reflected by the half mirror 13 is converted into a parallel beam by the collimator lens 14 and reaches the objective lens 15. The laser beam is converged onto the recording surface of the disc 17 by the objective lens 15 and forms an elliptic light spot.

The beam which was modulated by an information pit and reflected by the recording surface of the disc 17 passes through the objective lens 15 and collimator lens 14, is returned to the half mirror 13, is separated here from an optical path from the semiconductor laser device 11, and enters the photosensing surface of the photodetector 16 through the cylindrical lens 18.

As mentioned above, the first light emitting point A1 of the first light emitting portion 21 for emitting the first laser beam of the wavelength of 650 nm is located on the grating 12 side behind the second light emitting point A2 of the second light emitting portion 22 for emitting the second laser beam of the wavelength of 780 nm. Basiclly, a difference between the positions of the first and second light emitting points A1 and A2 is set so that a light converging point on the disc 17 is located on a proper position (for example, the recording surface) in consideration of a difference of angles of refraction at the time when the first and second laser beams of the different wavelengths pass through the same optical parts such as collimator lens 14, objective lens 15, and the like, namely, in consideration of wavelength dependency of a refractive index.

The first laser beam is emitted from the first light emitting portion 21 in the case where the disc 17 is a DVD as shown in FIG. 2, and the second laser beam is emitted from the second light emitting portion 22 in the case where the disc 17 is a CD as shown in FIG. 3. However, in the case where a disc is put on a turntable (not shown), the positions of the information recording surfaces from the disc surfaces of the respective DVD and CD where the laser beam enters are different from each other as shown by a reference numeral 17a in each of FIGS. 2 and 3. The difference between the positions of the first and second light emitting points A1 and A2 is actually set so that the laser beam is converged onto the information recording surface in consideration of both of the angle of refraction of the optical parts and the angle of refraction of the substrate portion from the disc surface to the information recording surface of each of the DVD and CD.

A length of the optical path from the light emitting point A1 of the first light emitting portion 21 to the information recording surface of the DVD through the optical parts such as grating 12, half mirror 13, collimator lens 14, and objective lens 15 is, therefore, shorter than a length of the optical path from the light emitting point A2 of the second light emitting portion 22 to the information recording surface of the CD through the optical parts such as grating 12, half mirror 13, collimator lens 14, and objective lens 15. In the case where the first light emitting portion 21 is driven and the first laser beam of the wavelength of 650 nm is emitted from the light emitting point A1, thus, the first laser beam transmitted through the optical parts in the optical path can be properly converged onto the recording surface of the DVD. Even in the case where the second light emitting portion 22 is driven and the second laser beam of the wavelength of 780 nm is emitted from the light emitting point A2, the second laser beam transmitted through the optical parts in the optical path can be properly converged onto the recording surface of the CD. That is, geneartion of chromatic aberration can be prevented even if either the laser beam of the wavelength of 650 nm is emitted for playing the DVD or the laser beam of the wavelength of 780 nm is emitted for playing the CD.

Figure 5:
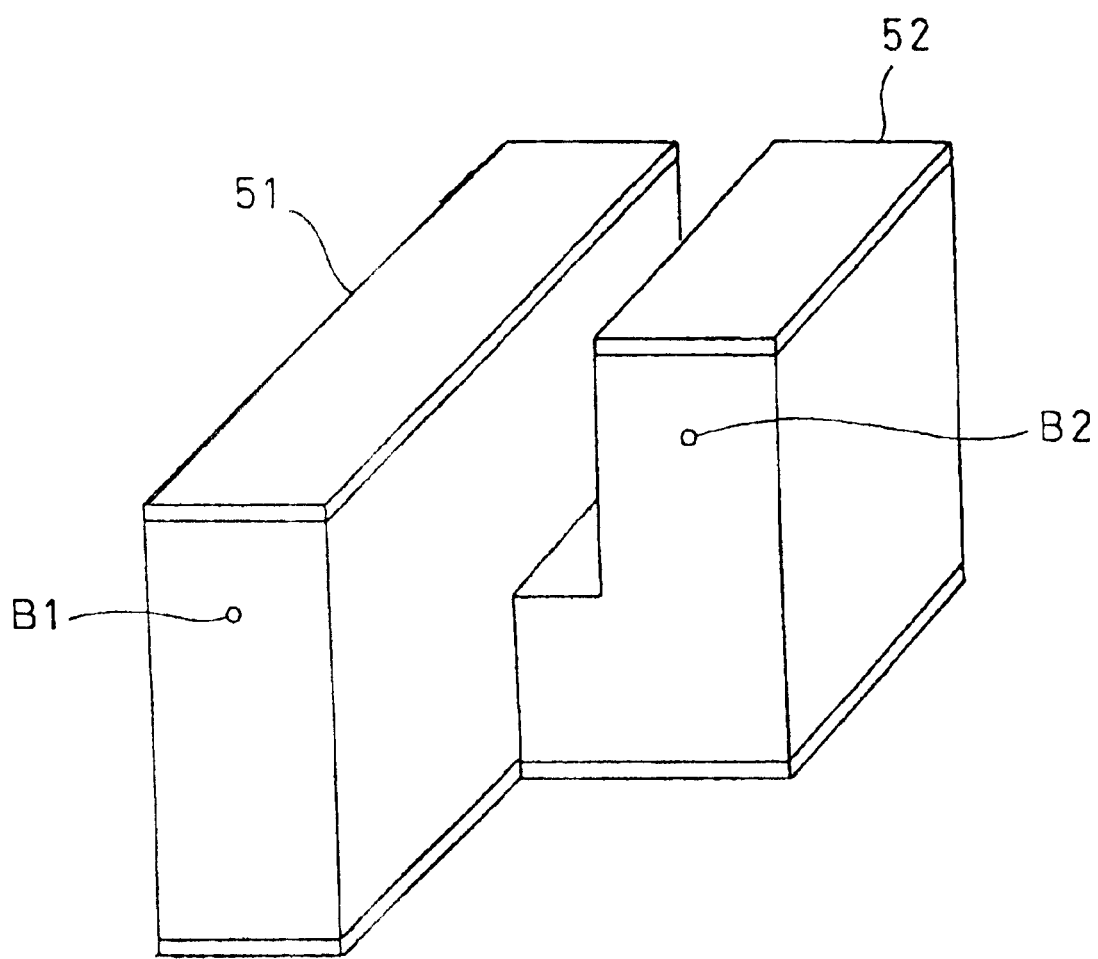
FIG. 5 is an external view showing a chip of a semiconductor laser device of a monolithic type.

Although the hybrid type device has been used as a semiconductor laser device 11 in the above embodiment, a semiconductor laser device of the monolithic type can be also used. FIG. 5 shows a semiconductor laser device of the monolithic type. In FIG. 5, a reference numeral 51 denotes a first light emitting portion for emitting the first laser beam of the wavelength of 650 nm. The first laser beam is emitted from a light emitting point B1. A reference numeral 52 denotes a second light emitting portion for emitting the second laser beam of the wavelength of 780 nm. The second laser beam is emitted from a light emitting point B2.

Figure 6A:
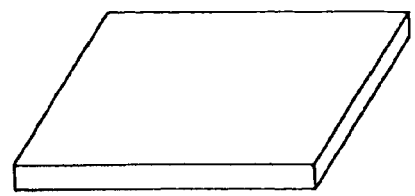
FIGS. 6A to 6E are diagrams showing a manufacturing procedure of the chip of FIG. 5.
Figure 6B:
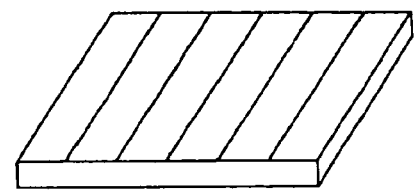
Figure 6C:
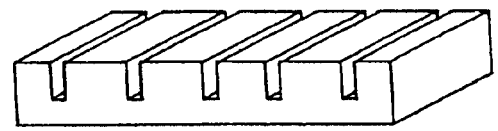
Figure 6D:
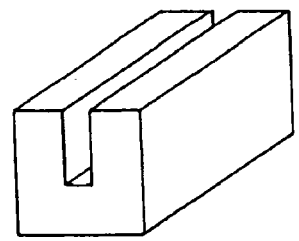
Figure 6E:
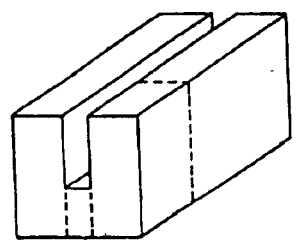

FIGS. 6A to 6E sequentially show a manufacturing procedure of the semiconductor laser device of the monolithic type in FIG. 5. FIG. 6A shows a cross sectional portion in an epitaxial growing step, FIG. 6B shows that in a stripe forming step, FIG. 6C shows that in a cleavage step, FIG. 6D shows that in a pellet forming step, and FIG. 6E shows that in a cleavage step of a part of the second light emitting portion and a substrate portion for obtaining the semiconductor laser device in FIG. 5.

Although the case where the invention is applied to the infinite optical system using the collimator lens 14 has been shown in the embodiments, it can be also applied to a finite optical system.

Further, although the two light emitting points of the different light emitting wavelengths are provided for the semiconductor laser device in the above embodiments, the invention can be also applied to a semiconductor laser device having three or more light emitting points of different light emitting wavelengths.

As mentioned above, according to the present invention, since the light emitting points of a plurality of light emitting portions are located at the different positions in the same emitting direction, even if the laser beam of an arbitrary wavelength is emitted, it can be properly converged to the recording surface of the recording medium and generation of the chromatic aberration can be prevented. There is no need to use the optical parts such as a synthesizing prism and the like as compared with the conventional apparatus and, further, the optical system can be concentratedly arranged in a compact form, so that the construction of the optical pickup apparatus can be simplified and miniaturized.

What is claimed is:

1. A laser diode chip for an optical pickup apparatus, said laser diode chip comprising:
   a substrate; and
   a plurality of light emitting portions which are formed on said substrate for emitting laser beams to be irradiated to a recording medium in a same emitting direction, each of said plurality of light emitting portions being provided for reading information recorded on a recording medium and the laser beams having different wavelengths so as to correspond to different types of recording medium,
   wherein respective light emitting points of said plurality of light emitting portions are located at different positions in the emitting direction, and
   wherein said laser diode chip, including the substrate, is provided separate from the optical pickup apparatus.

2. A laser diode chip according to claim 1, wherein the respective light emitting points of said plurality of light emitting portions are located in an order in which a short wavelength of each of the laser beams emitted from the light emitting points is forward in the emitting direction as compared to an emitting portion of a longer wavelength beam.

3. A laser diode chip according to claim 1, wherein said plurality of light emitting portions are formed on one surface of said substrate and a common electrode is formed on the other surface of said substrate.

4. An optical pickup apparatus comprising:
   a light emitting device which has a substrate, and a plurality of light emitting portions for emitting laser beams to be irradiated to a recording medium which are formed on said substrate, each of said plurality of light emitting portions being provided for reading information recorded on a recording medium and the laser beams having different wavelengths and are selectively emitted in a same emitting direction from one of said plurality of light emitting portions in accordance with the type of said recording medium; and
   an optical system for guiding the laser beams emitted from said light emitting device to a recording surface of said recording medium and guiding a laser beam reflected by the recording surface of said recording medium to a photosensing device,
   wherein said light emitting device is constructed so that respective light emitting points of said plurality of light emitting portions are located at different positions in the emitting direction, and wherein said light emitting device, including the substrate, is provided separate from said optical system.

5. An optical pickup apparatus according to claim 4, wherein lengths of optical paths from the light emitting points of said plurality of light emitting portions to the recording surface of said recording medium are short in order of short wavelength of each of the laser beams emitted from the light emitting points.

* * * * *